(12) United States Patent
Rhinelander et al.

(10) Patent No.: US 8,548,969 B2
(45) Date of Patent: Oct. 1, 2013

(54) SYSTEM AND METHOD FOR CLUSTERING CONTENT ACCORDING TO SIMILARITY

(75) Inventors: Ned Rhinelander, San Francisco, CA (US); Clifford Lyon, San Francisco, CA (US)

(73) Assignee: CBS Interactive Inc., San Francisco, CA (US)

( * ) Notice: Subject to any disclaimer, the term of this patent is extended or adjusted under 35 U.S.C. 154(b) by 42 days.

(21) Appl. No.: 12/895,075

(22) Filed: Sep. 30, 2010

(65) Prior Publication Data

US 2011/0302163 A1 Dec. 8, 2011

Related U.S. Application Data

(63) Continuation-in-part of application No. 12/792,029, filed on Jun. 2, 2010.

(60) Provisional application No. 61/360,490, filed on Jun. 30, 2010.

(51) Int. Cl.
*G06F 17/30* (2006.01)

(52) U.S. Cl.
USPC ........... 707/706; 707/713; 707/722; 707/736; 707/758; 707/781

(58) Field of Classification Search
USPC .................................................. 707/600–899
See application file for complete search history.

(56) References Cited

U.S. PATENT DOCUMENTS

| | | | |
|---|---|---|---|
| 5,924,096 | A | 7/1999 | Draper et al. |
| 6,859,799 | B1 | 2/2005 | Yuen |
| 7,243,102 | B1 | 7/2007 | Naam et al. |
| 2004/0064449 | A1 | 4/2004 | Ripley et al. |
| 2005/0027670 | A1 | 2/2005 | Petropoulos |
| 2007/0244892 | A1 | 10/2007 | Narancic |
| 2007/0271292 | A1* | 11/2007 | Acharya et al. ............... 707/102 |
| 2007/0299949 | A1 | 12/2007 | Macbeth et al. |
| 2008/0201348 | A1 | 8/2008 | Edmonds et al. |
| 2010/0030736 | A1 | 2/2010 | Chi et al. |
| 2010/0082575 | A1 | 4/2010 | Walker et al. |
| 2010/0138427 | A1* | 6/2010 | Van De Par et al. .......... 707/748 |

* cited by examiner

*Primary Examiner* — Isaac M Woo

(74) *Attorney, Agent, or Firm* — Marc S. Kaufman; Stephen M. Hertzler; Reed Smith LLP

(57) ABSTRACT

Systems and methods for clustering content according to similarity are provided that identify and group similar content using a set of tags associated with the content. A topic model of a group of content is built, producing a probability distribution of topic membership for the content. Individual items of content are then clustered using a clustering algorithm, and a distance matrix from the probability distribution is built. Based on the distance matrix, individual items of content are labeled as "must-link" or "cannot-link" pairs with the group of content. The topic model is then embedded into successively smaller dimensions using a kernel method, until the clustering is stable with respect to both the behavioral and content domains.

18 Claims, 4 Drawing Sheets

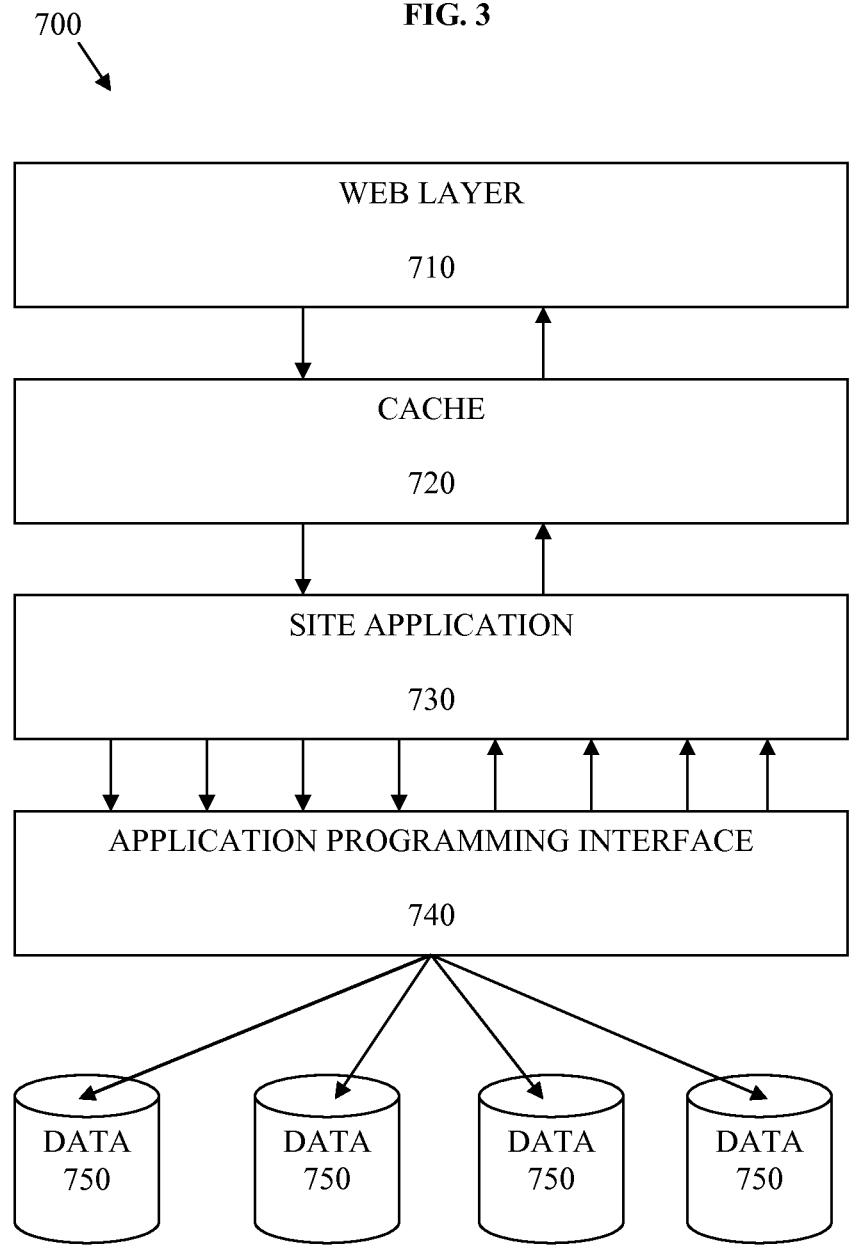

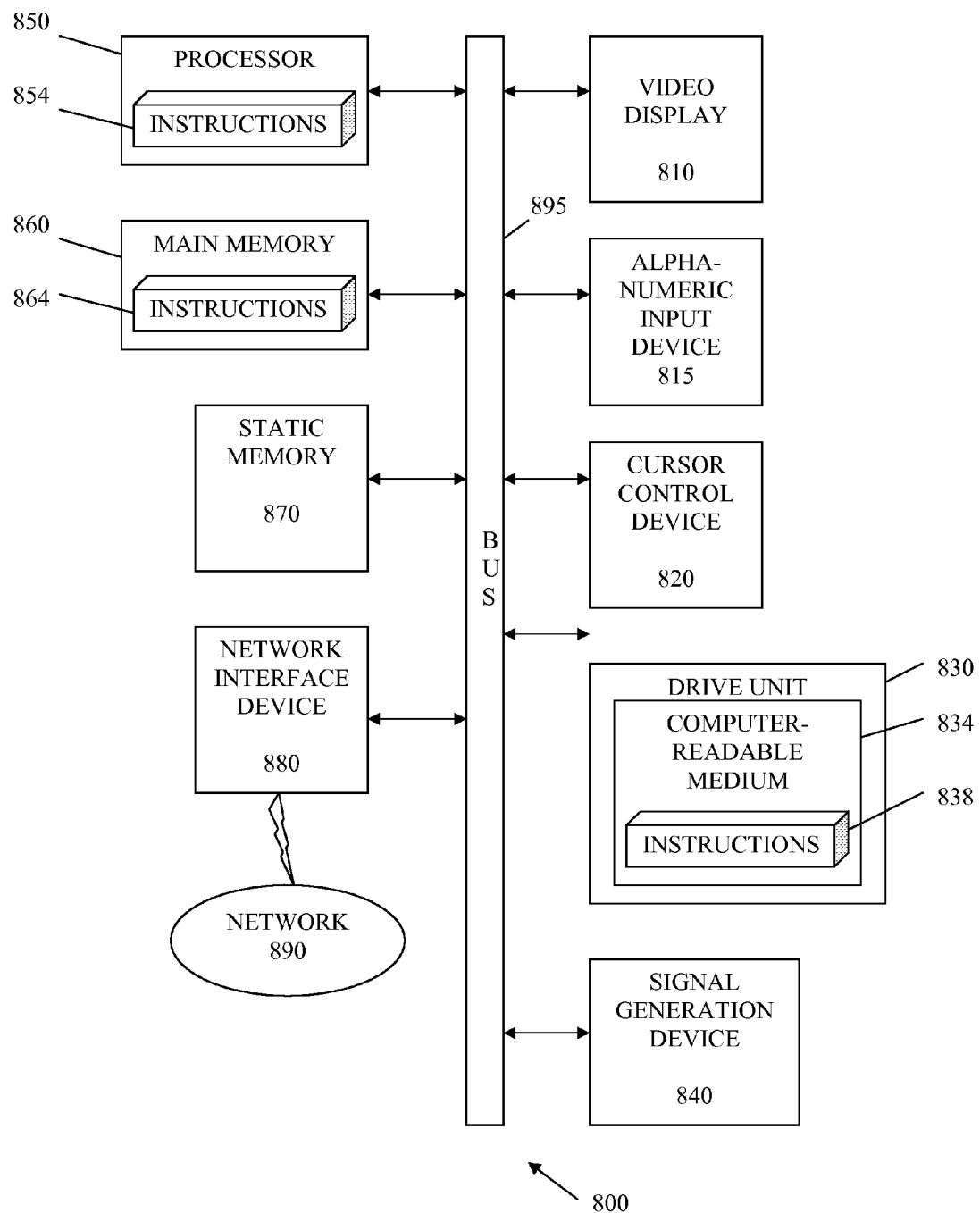

SYSTEM AND METHOD FOR CLUSTERING CONTENT ACCORDING TO SIMILARITY

RELATED APPLICATION DATA

This application is a continuation-in-part of U.S. patent application Ser. No. 12/792,029, filed Jun. 2, 2010, the disclosure of which is hereby incorporated by reference in its entirety. This application claims benefit from U.S. Provisional Application No. 61/360,490 filed Jun. 30, 2010, the disclosure of which is hereby incorporated by reference in its entirety.

BACKGROUND

1. Field of the Invention

The present invention relates to content classification, and more particularly, a system and method for clustering content according to similarity.

2. Description of Related Art

Most content is now stored in digital form and accessible over networks. For example, Document Management Systems (DMS) provide repositories of documents that can be searched and accessed over a computer network. Most DMS implementations are within a domain, such as a company, and are used to store documents that can be categorized in a relatively narrow set of topics. For example, a law firm may have legal briefs and other legal documents stored in a DMS. Also, downloadable or streaming media content is available in various domains.

Of course, various repositories of documents and other content items can be accessed over the internet. The most common way of discovering content on the internet is through the use of search engines, which index the content and then provide links to the content in response to keyword or topical search queries. More recently, it has become popular to associate topical or other descriptive tags, from a set of tags, with content to facilitate content discovery and retrieval. The set of tags can be arranged in an ontology or other arrangement and applied to content in a manner which helps describe the content. Of course, the tags facilitate content discovery because indexing of the document is not required and the tags convey a sense of what the content is about in a semantic or topical sense. Ideally, the set of tags associated with a document represent a compressed or minimal description of the document, which serves to both associate the document with its most similar neighbors, and to discriminate it from others unlike it.

However, there are many limitations to developing a set of tags and associating tags with content. For example, different domains may use different sets of tags and tag arrangements. This may cause inconsistencies and even lack of interoperability between domains. Even within a domain with a predetermined tag arrangement, the sheer amount of content makes it difficult to apply tags in a meaningful manner. There are tools for automated tagging. However, such tools are limited and are not effective across broad spectrums of topics and content. Furthermore, tags alone may not accurately reflect the similarity of one item of content to one or more other items of content, when analyzing and forming groups of content.

BRIEF DESCRIPTION OF THE DRAWINGS

The present invention will be understood more fully from the detailed description and the accompanying drawings, of various embodiments of the invention, which, however, should not be taken to limit the invention to the specific embodiments, but are for explanation and understanding only.

FIG. 3 is a block diagram of another system architecture for implementing the method according to one embodiment.

FIG. 4 is a schematic diagram of an exemplary computer system according to one embodiment.

DETAILED DESCRIPTION

There is a need for improved systems and methods for identifying and grouping similar content. The disclosed embodiments meet those needs and others by providing a system and method combining behavioral modeling with content clustering to group content according to similarity. By exploiting the pairwise constraints developed from a user behavioral model, embodiments of the system and method result in more robust, accurate and stable clustering performance.

A topic model of a group of content is built, producing a probability distribution of topic membership for each document within the group of content which can be treated as a vector. Each document represents a data point in a dataset to be clustered by a clustering algorithm. In addition to the topic distribution for each document, side information based on user behavior and in the form of constraints is utilized to boost clustering. The side information can take the form of "must-link" and "cannot-link" data point pairs. "Must-link" pairs will reside in the same cluster; "cannot-link" pairs will reside in different clusters. Initially, the data is projected into a subspace where the must-link pairs are close together, and the cannot-link pairs are far apart. The data points in the subspace are then clustered, algorithm parameters are adjusted based on consistency of the clustering and the side information, and the data points are projected again in order to satisfy outstanding constraints. These steps can be repeated iteratively until the clustering is stable with respect to both the behavioral and content domains. For a general description of clustering, see, Y. Liu, R. Jin, and A. K. Jain, "BoostCluster: Boosting Clustering by Pairwise Constraints"; In ICDM '07, 2007.

In the following description, for purposes of explanation, numerous specific details are set forth in order to provide a thorough understanding of the exemplary embodiments. It is apparent to one skilled in the art, however, that the present invention can be practiced without these specific details or with an equivalent arrangement. In some instances, well-known structures and devices are shown in block diagram form in order to avoid unnecessarily obscuring the preferred embodiment.

Figure 1:
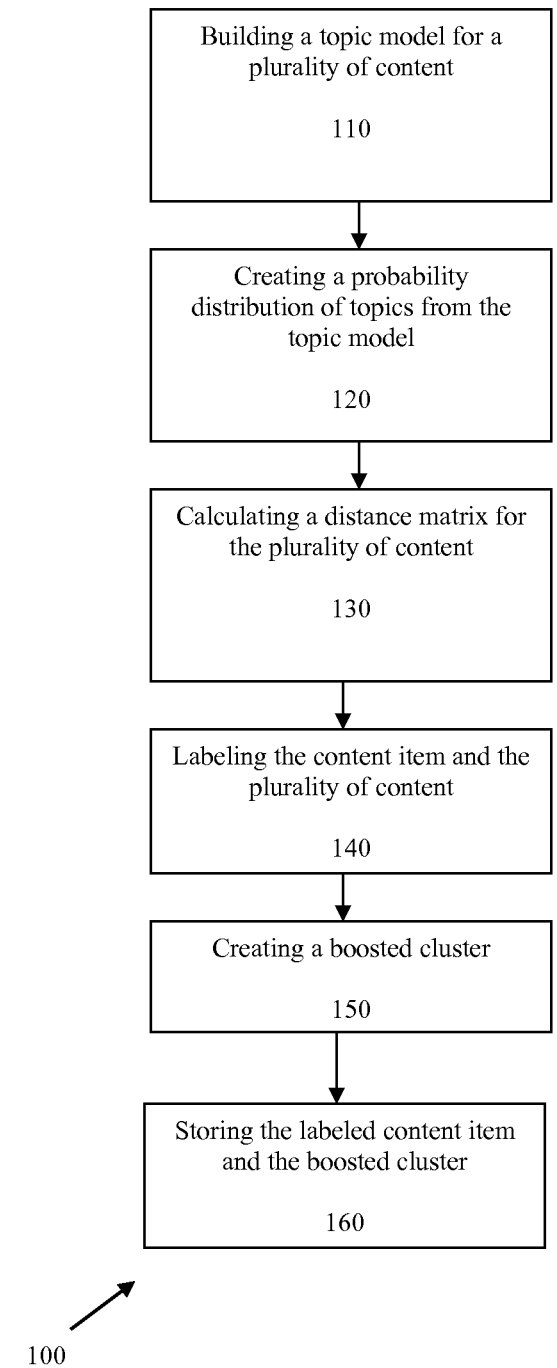
FIG. 1 is a flowchart illustrating the method according to one embodiment.

Referring now to the drawings, wherein like reference numerals designate identical or corresponding parts throughout the several views, FIG. 1 is a flowchart 100 illustrating an embodiment of a method for clustering content according to similarity. At processing block 110, a set of features for content items, such as a topic model for the content items, is built or received. The topic model can be built, for example, using latent Dirichlet allocation (LDA), or a similar generative model. LDA explains sets of observations regarding data similarity with unobserved groups. For example, an observation that words are collected into documents may result in an explanation that each of the documents is a mixture of a few topics, and that each word of each document corresponds to a topic within that document. Each document is viewed as a mixture of various topics, with words having no particular relevance, such as "the", "and", "a", etc., being unassociated with any topic or being relatively equally associated with many topics.

A topic model can thus be created by identifying the topic of each specific word. For example, a document may have the words "laptop", "cell phone", "DVR", "camera", and "MP3 player". The word "laptop" may be associated with multiple topics, such as brand names, laptop parts, "computer", "electronics", etc. "Cell phone", "DVR", "camera", and "MP3 player" may have different or only slightly overlapping topics, but may all be associated with the topic "electronics". Thus, the topic "electronics" can be added to the topic model, along with other topics identified in a similar fashion.

One or more topical tags associated with a content item can be identified using the topic model and clustered. Topical tags can be identified from, for example, an activity log of search queries (such as is described in U.S. patent application Ser. No. 12/792,029, filed Jun. 2, 2010, hereby incorporated by reference in its entirety), and/or from markup language code (such as is described in U.S. Provisional Application No. 61/312,006, filed Mar. 9, 2010, hereby incorporated herein by reference in its entirety). Alternatively, topical tags can be determined in any appropriate manner.

Topical tags can also be identified by a clustering algorithm, which performs what is commonly referred to as "text mining". Any suitable clustering algorithm can be used, including, but not limited to, hierarchical algorithms (including agglomerative algorithms, divisive algorithms, and BIRCH algorithms), partitional algorithms (including K-means clustering algorithms, fuzzy clustering algorithms, QT clustering algorithms, locality-sensitive hashing algorithms, graph-theoretic methods, and CLARANS algorithms), density-based clustering algorithms (including DBSCAN and OPTICS algorithms), subspace clustering algorithms (including correlation clustering algorithms and two-way clustering/co-clustering/bi-clustering algorithms), and spectral clustering algorithms (including Normalized Cuts algorithms and Meila-Shi algorithms). The topic model of processing block 110 can be pre-existing and can be received, i.e. made available to the method and apparatus discussed below.

At processing block 120, a probability distribution of topics for the plurality of content is created from the topic model. The probability distribution can be determined by analyzing the topic model to determine the probability that the topics within the model are indeed associated with the content. For example, the topic "electronics" may only be associated with 1% of the words within the content, while the topic "software" may be associated with 25% of the words within the content. Thus, the probability distribution may reflect that there is a high probability that the content is associated with the topic "software", and a relatively low probability that that it is associated with the topic "electronics". In one embodiment, the probability distribution can be represented by a vector.

At processing block 130, a distance matrix can be calculated for the plurality of content from the probability vectors. The distance matrix can be made using a variety of functions including, but not limited to, the Euclidean distance (also known as the 2-norm distance), the Manhattan distance (also known as the 1-norm distance), the maximum norm (also known as the infinity norm distance), the Mahalanobis distance, and the Hamming distance.

At processing block 140, the content item and the plurality of content items are labeled as a pairwise constraint, such as a must-link pair or cannot-link pair, based on the distance matrix. The content item and the plurality of content items are labeled according to "boosted clustering", which improves clustering by the pairwise behavioral constraints: must-link pairs (where the content item and the plurality of content items should belong to the same cluster), and cannot-link pairs (where the content item and the plurality of content should belong to different clusters).

In order to identify whether the content item and the plurality of content are must-link pairs or cannot-link pairs, a subspace within the plurality of content items is first found that separates the must-link pairs within the content items from the cannot-link pairs. This subspace can be found, for example, by iteratively applying a kernel method until the pairs are separated and a convergence is reached, i.e. the movement of the data points becomes nominal. The kernel method applies a class of algorithms to perform pattern analysis on the data by mapping it into successively smaller dimensional spaces made up of the top eigenvectors of the must-link and cannot-link pairs. This mapping transforms the data into a set of points in a Euclidean space, which reveal relations in the data.

Once the subspace is established, data points relative to the content item are projected onto the subspace, where the appropriate pairwise constraint (i.e. must-link or cannot-link) is found and assigned, creating a boosted cluster at processing block 150. At processing block 160, the labeled content item and boosted cluster are stored in a tangible computer readable media, where it can be used, for example, to improve the accuracy of future clustering of content, to search and/or locate content corresponding to specific topics, to catalog content, to aggregate content corresponding to specific topics, and/or to label the content for any purpose.

The must-link/cannot-link relationship is determined based on user behavior. For example, as users traverse a web site, or other content repository, the items of content viewed by the user is monitored and stored. For example, a simple table of user ID and item ID can be created based on the content viewed by the user. As an example, the table can be as follows

| | |
|---|---|
| User 1 | Content a |
| User 1 | Content c |
| User 1 | Content e |
| User 2 | Content c |
| User 2 | Content d |

Statistical analysis can be applied to determine content that should and should not be paired. As examples, frequency of occurrence and co-occurrence and the like can be used. For example, if one considers the set A of site visitors who engaged with some item a, and the set of site visitors B who engaged with a potentially related item b, various metrics, such as probabilistic and entropy-based metrics can be applied.

Probability-based metrics look at the relationship between two items in terms of the overall likelihood a user would be interested in the items independently, together, and overall. Such metrics are generally known. For example *Interesting Measures for Association Rules* is a good reference for such metrics. Conditional probability, sometimes referred to as "confidence", is one of the most simple probability-based measures and can be expressed as follows.

$$\text{Confidence } (A, B) = P(B \mid A) = \frac{P(A \cap B)}{P(A)}$$

An alternative metric to confidence, and one intended to better capture directionality of associations (the chance that b appears without a) is "conviction". Conviction can be expressed as follows.

$$\text{Conviction } (A, B) = \frac{P(A)P(\overline{B})}{P(A, \overline{B})}$$

"Improvement" is a metric of how much more often a and b occur together than if they were independent. In other words, improvement is the ratio of conditional probability to the prior of b. This measure will do better at surfacing relationships in the "long tail" than confidence or conviction. Improvement can be expressed as follows.

$$\text{Improvement } (A, B) = \frac{P(B \mid A)}{P(B)} = \frac{P(A \cap B)}{P(A)P(B)}$$

"Leverage" is similar to improvement, except that it is the arithmetic difference between the quantities instead of the ratio. Leverage can be expressed as follows.

Leverage$(A,B) = P(A \cap B) - P(A)P(B)$

"Information gain" measures look at the similarity between a and b from the point of view of Shannon entropy. This type of measure is sometimes more robust and predictive than simple probabilistic measures. These metrics measure redundant information between items or item sets. A general disclosure of such metrics can be found in *Information Gain Tutorial Slides*. "Information gain" is a metric measuring how much what you already know about a, saves you in trying to tell someone about b—as compared to the situation where you know nothing at all about a. Information gain can be expressed as follows.

InfoGain$(A,B) = H(B) - H(B \mid A)$ where $H(X) = -\Sigma p(x) \log(p(x))$ and $H(Y \mid X) = H(Y,X) - H(X)$ "Normalized Mutual Information" is a measure of the information that a and b share: it measures how much knowing one of these variables reduces our uncertainty about the other. For example, if a and b are independent, then knowing a does not give any information about b and vice versa. In such an example the mutual information is zero. In contrast, if a and b are equal then knowing a determines the value of b and vice versa. Normalized mutual information is symmetric and can be expressed as follows.

$$U(A, B) = \frac{I(A; B)}{H(A) + H(B)}$$

where $I(A; B) = H(A) + H(B) - H(A, B)$

Relative Information Gain can be thought of as the "Improvement" of the entropy metrics and can be expressed as follows.

$$RIG(A, B) = H(B) - \frac{H(B \mid A)}{H(B)}$$

"Cosine similarity" is often used in a vector space model. Logically, there is a vector for each product with members for each user; the value of a member is "1" when a user is interested, "0" otherwise. Practically, the case when users are not interested is not stored. In the case of association rules, cosine simplifies to the count of people interested in both items, normalized by the count of people interested in both, since the values in the vectors are binary. Cosine similarity can be expressed as follows.

$$\text{Cosine } (A, B) = \frac{A \cdot B}{|A||B|}$$

The "Jaccard Index" is known from set math and is a measure of the similarity between two sets A and B using cardinality of set intersection and set union. Jaccard Index can be expressed as follows.

$$\text{Jaccard } (A, B) = \frac{|A \cap B|}{|A \cup B|}$$

The metrics above can be applied to the data indicating user behavior, described above, to establish the pair wise constraints in step 140, also described above. The constraints are then used to "boost" the clustering (step 150) obtained in steps 120 and 130 above. This permits the user knowledge of the content of the items to be leveraged within an automated clustering and tagging environment.

Figure 2:
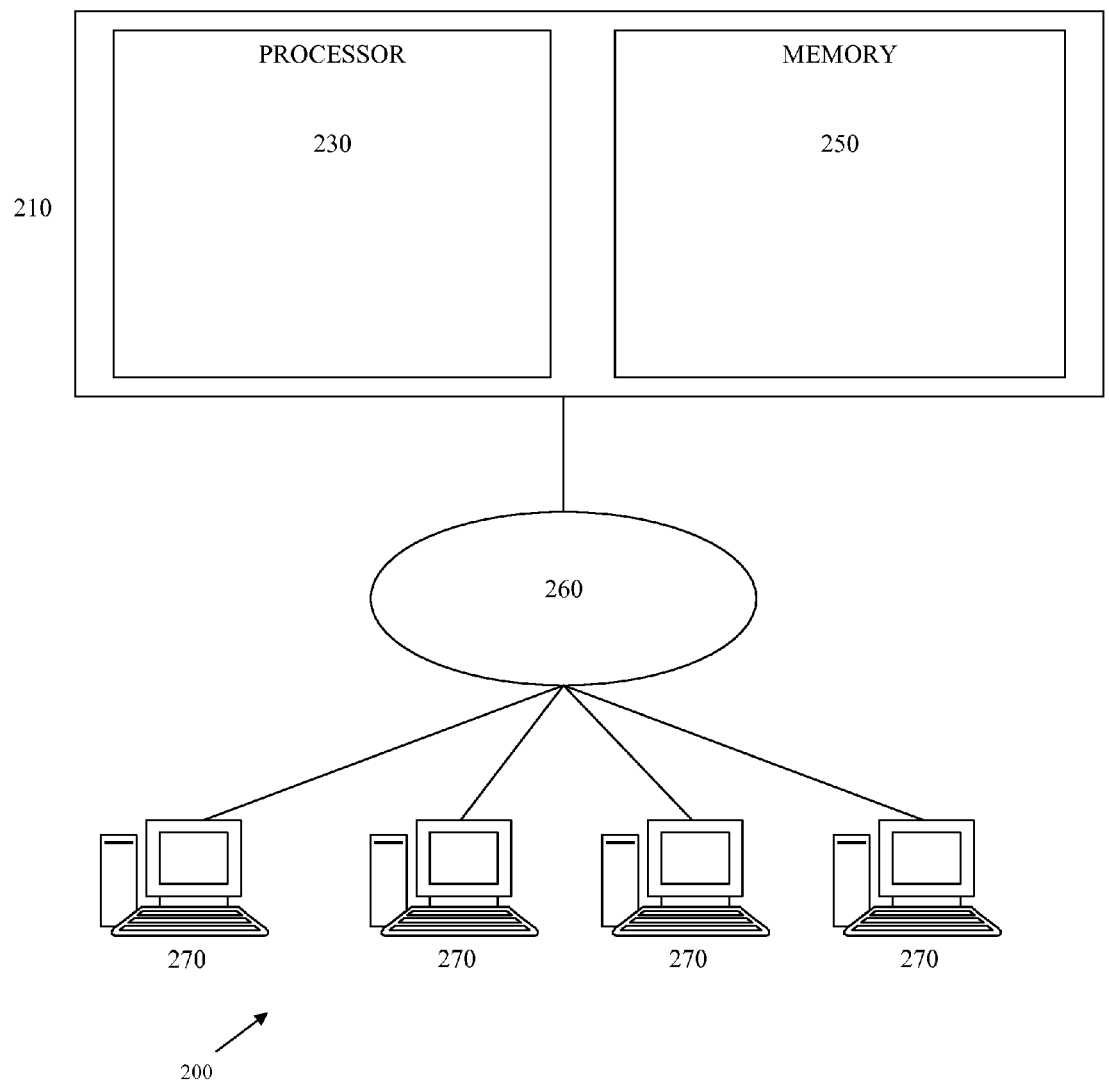
FIG. 2 is a system for effecting the method according to another embodiment.

FIG. 2 illustrates system 200 of an embodiment for effecting the functions described above. Server 210 is connected over network 260 to a plurality of hosts 270. Server 210 includes processor 230 and memory 250, which are in communication with one another. Server 210 is configured to cluster content retrieved from the plurality of hosts 270 according to similarity. Server 210 is typically a computer system, and may be an HTTP (Hypertext Transfer Protocol) server, such as an Apache server. Server 210 may be built using a standard LAMP or other solution stack. Memory 250 may be any type of tangible computer readable media that may be volatile or non-volatile memory that includes, for example, read-only memory (ROM), random access memory (RAM), magnetic disk storage media, optical storage media, flash memory devices, and zip drives. Network 260 may be a local area network (LAN), wide area network (WAN), a telephone network, such as the Public Switched Telephone Network (PSTN), an intranet, the Internet, or combinations thereof. The plurality of hosts 270 may be servers (similarly or differently configured than server 210, as described above), mainframes, minicomputers, personal computers, laptops, personal digital assistants (PDAs), cell phones, netbooks, thin clients, and other computing devices. The plurality of hosts 270 are characterized in that they are capable of being connected to network 260. The plurality of hosts 270 typically include memory.

In use, when a user wants to, for example, cluster content as described above, a request is communicated to one or more of hosts 270 over network 260. For example, a signal is transmitted from server 210, the signal having a destination address (i.e., address representing the host), a request (i.e., a plurality of content and/or a content item), and a return address (i.e., address representing the server that initiated the request). Processor 230 retrieves a plurality of content and/or a content item from host 270. For example, another signal may be transmitted that includes a destination address corresponding to the return address of the server and the content responsive to the request. Processor 230 also builds, or receives a topic model for the plurality of content; creates, or receives, a probability distribution of topics for the plurality of content from the topic model; calculates a distance matrix for the plurality of content; labels content items within the plurality of content as pairwise constraints based on the distance matrix; and creates a boosted cluster by incorporating the pairwise constraint into the probability distribution. Memory 250 stores the labeled content items and the boosted cluster. The functions of this and other embodiments can be described as modules of computer executable instructions recorded on tangible media. The modules can be segregated in various manners over various devices.

As shown in another embodiment FIG. 3, system architecture 700 includes web layer 710, cache 720, site application 730, application programming interface 740, and a plurality of data stores 750. It will be appreciated that the system architecture may vary from the illustrated architecture. For example, web layer 710 may directly access data stores 750, the site application may directly access data stores 750, system architecture 700 may not include cache 720, etc., as will be appreciated by those skilled in the art. Web layer 710 is configured to receive requests for a plurality of content and/or a content item, and return content responsive to the request. Web layer 710 communicates the request to cache 720. Cache 720 is configured to temporarily store content that is accessed frequently by web layer 710 and can be rapidly accessed by web layer 710. In one embodiment, cache 720 may be a caching proxy server. Cache 720 communicates the requests to site application 730.

Site application 730 is configured to update cache 720 and to process requests received from web layer 719. Site application 730 may identify that the content from the requests corresponds to data from multiple sources. Site application 730 can then convert the request into a request for content from multiple sources and transmit these requests to application programming interface 740. Application programming interface 740 is configured to either simultaneously or consecutively access content from the plurality of data stores 750 to collect the data responsive to the plurality of requests from site application 730. The plurality of data stores 750 may include content such as, for example, documents, web pages, multimedia, and the like. It will be appreciated that in alternative embodiments only one data store 750 may be provided to store the data.

The data in data stores 750 is provided to application programming interface 740, which provides the content to site application 730. Site application 730 updates cache 720 and delivers the cached content in combination with the accessed content to web layer 710, which delivers the content to the requestor.

In the embodiments described in FIGS. 2-3, the content is at least partially stored remotely at a host over a network. However, it is contemplated that the content could be stored and accessed solely in memory (in which case a network is not necessary, and may or may not exist in the system), as one skilled in the art would understand and appreciate, and as is described further herein.

FIG. 4 shows a diagrammatic representation of a machine in the exemplary form of computer system 800 within which a set of instructions, for causing the machine to perform any of the one or more methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Computer system 800 includes processor 850 (e.g., a central processing unit (CPU), a graphics processing unit (GPU) or both), main memory 860 (e.g., read only memory (ROM), flash memory, dynamic random access memory (DRAM) such as synchronous DRAM (SDRAM) or Rambus DRAM (RDRAM), etc.) and static memory 870 (e.g., flash memory, static random access memory (SRAM), etc.), which communicate with each other via bus 595.

Computer system 800 may further include video display unit 810 (e.g., a liquid crystal display (LCD) or a cathode ray tube (CRT)). Computer system 800 also includes alphanumeric input device 815 (e.g., a keyboard), cursor control device 820 (e.g., a mouse), disk drive unit 830, signal generation device 840 (e.g., a speaker), and network interface device 880.

Disk drive unit 830 includes computer-readable medium 834 on which is stored one or more sets of instructions (e.g., software 838) embodying any one or more of the methodologies or functions described herein. Software 838 may also reside, completely or at least partially, within main memory 860 and/or within processor 850 during execution thereof by computer system 800, main memory 860 and processor 850 also constituting computer-readable media. Software 838 may further be transmitted or received over network 890 via network interface device 880.

While computer-readable medium 834 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the machine and that cause the machine to perform any one or more of the methodologies of the present invention. The term "computer-readable medium" shall accordingly be taken to include, but not be limited to, solid-state memories, and optical and magnetic media.

It should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention.

Other implementations of the invention will be apparent to those skilled in the art from consideration of the specification and practice of the invention disclosed herein. Various aspects and/or components of the described embodiments may be used singly or in any combination. It is intended that the specification and examples be considered as exemplary only, with a true scope and spirit of the invention being indicated by the following claims.

What is claimed is:

1. A computer implemented method for clustering content according to similarity, the method comprising:
   receiving a set of features for a plurality of content items;
   calculating, by a processor, a distance matrix for the plurality of content items based on data indicating user behavior relative to at least some of the content items, wherein the data includes information associated with one or more users accessing at least one of the content items;
   labeling, by a processor, at least some of the content items as pairwise constraints based on the distance matrix; and
   creating, by a processor, a boosted cluster by incorporating the pairwise constraints into a clustering algorithm.

2. The method of claim 1, wherein at least one of the plurality of content and the content items is a document.

3. The method of claim 2, wherein the document is a web page.

4. The method of claim 1, wherein the set of features is in the form of a topic model built using latent Dirichlet allocation (LDA).

5. The method of claim 1, further comprising determining a probably distribution of topics for the plurality of content items.

6. The method of claim 1, further comprising:
   applying a pattern analysis to the boosted cluster; and
   modifying the boosted cluster based on relations identified by the pattern analysis.

7. The method of claim 6, wherein the pattern analysis is applied using a kernel method.

8. The method of claim 1, further comprising identifying topical tags from at least one of an activity log of a search query, markup language code, and text mining.

9. The method of claim 1, wherein the data further includes information identifying at least one of the one or more users.

10. A system for clustering content according to similarity, the system comprising:
    a processor configured to:
      receive a set of features for a plurality of content items;
      calculate a distance matrix for the plurality of content based on data indicating user behavior relative to at least some of the content items, wherein the data includes information associated with one or more users accessing at least one of the content items;
      label content items as a pairwise constraint based on the distance matrix; and
      create a boosted cluster by incorporating the pairwise constraint into a clustering algorithm; and
    a tangible computer readable media configured store the boosted cluster.

11. The system of claim 10, wherein at least one of the plurality of content items is a document.

12. The system of claim 11, wherein the document is a web page.

13. The system of claim 10, wherein the set of features is in the form of a topic model built using latent Dirichlet allocation (LDA).

14. The system of claim 10, wherein processor is further configured to determine a probably distribution of topics for the plurality of content items.

15. The system of claim 10, wherein the processor is further configured to:
    apply a pattern analysis to data points representing the boosted cluster; and
    modify the boosted cluster based on relations identified by the pattern analysis.

16. The system of claim 15, wherein the pattern analysis is applied by the processor using a kernel method.

17. The system of claim 10, wherein the processor is further configured to identify topical tags from at least one of an activity log of a search query, markup language code, and text mining.

18. The system of claim 10, wherein the data further includes information identifying at least one of the one or more users.

* * * * *